United States Patent
Falkenthros

(10) Patent No.: US 7,290,145 B2
(45) Date of Patent: Oct. 30, 2007

(54) SYSTEM FOR PROVIDING SERVICES AND VIRTUAL PROGRAMMING INTERFACE

(75) Inventor: Henrik Bo Falkenthros, Bronshoj (DK)

(73) Assignee: Bridicum A/S (DK)

( * ) Notice: Subject to any disclaimer, the term of this patent is extended or adjusted under 35 U.S.C. 154(b) by 768 days.

(21) Appl. No.: 10/470,460

(22) PCT Filed: Jan. 26, 2001

(86) PCT No.: PCT/DK01/00060

§ 371 (c)(1),
(2), (4) Date: Nov. 20, 2003

(87) PCT Pub. No.: WO02/059803

PCT Pub. Date: Aug. 1, 2002

(65) Prior Publication Data

US 2004/0073662 A1   Apr. 15, 2004

(51) Int. Cl.
G06F 9/00 (2006.01)
(52) U.S. Cl. .................................. 713/182; 713/168
(58) Field of Classification Search ............... 713/182, 713/168
See application file for complete search history.

(56) References Cited

U.S. PATENT DOCUMENTS 5,136,581 A * 8/1992 Muehrcke ............... 370/261
5,377,196 A    12/1994 Godlew et al.
5,416,833 A * 5/1995 Harper et al. ........... 379/201.05
5,796,953 A    8/1998 Zey

FOREIGN PATENT DOCUMENTS

| EP | 0 986 229 | 3/2000 |
|---|---|---|
| JP | 06177893 | 6/1994 |
| JP | 11143730 | 5/1999 |
| WO | WO 00/38051 | 6/2000 |

OTHER PUBLICATIONS

Alexander Egyed and Philippe B. Kruchten; "Rose/Architect: a tool to visualize architecture"; Proceedings 32nd Annual Hawaii International Conference on Systems Sciences, 1999, HICSS—32, 10 pages, Jan. 5-8, 1999; Maui, Hi, USA, 1999; Section 5.2, 9, abstract.
International Search Report; PCT/DK 01/00060; Feb. 28, 2002.

* cited by examiner

*Primary Examiner*—Thomas Peeso
(74) *Attorney, Agent, or Firm*—Cantor Colburn LLP

(57) ABSTRACT

The invention relates to a system for providing customer requested services relating to security, monitoring and/or data acquisition in relation to a data processing device and/or a data network of a customer, where
one or more of a plurality of tests are selected to be executed in relation to the data processing device and/or a data network,
the selection of one or more tests being executed from a server which is connectable to the data processing devices and/or data network via a communication network, and where
data representing results of the selection of tests may be accessed by the customer via a communication network and/or transmitted to the customer.

29 Claims, 7 Drawing Sheets

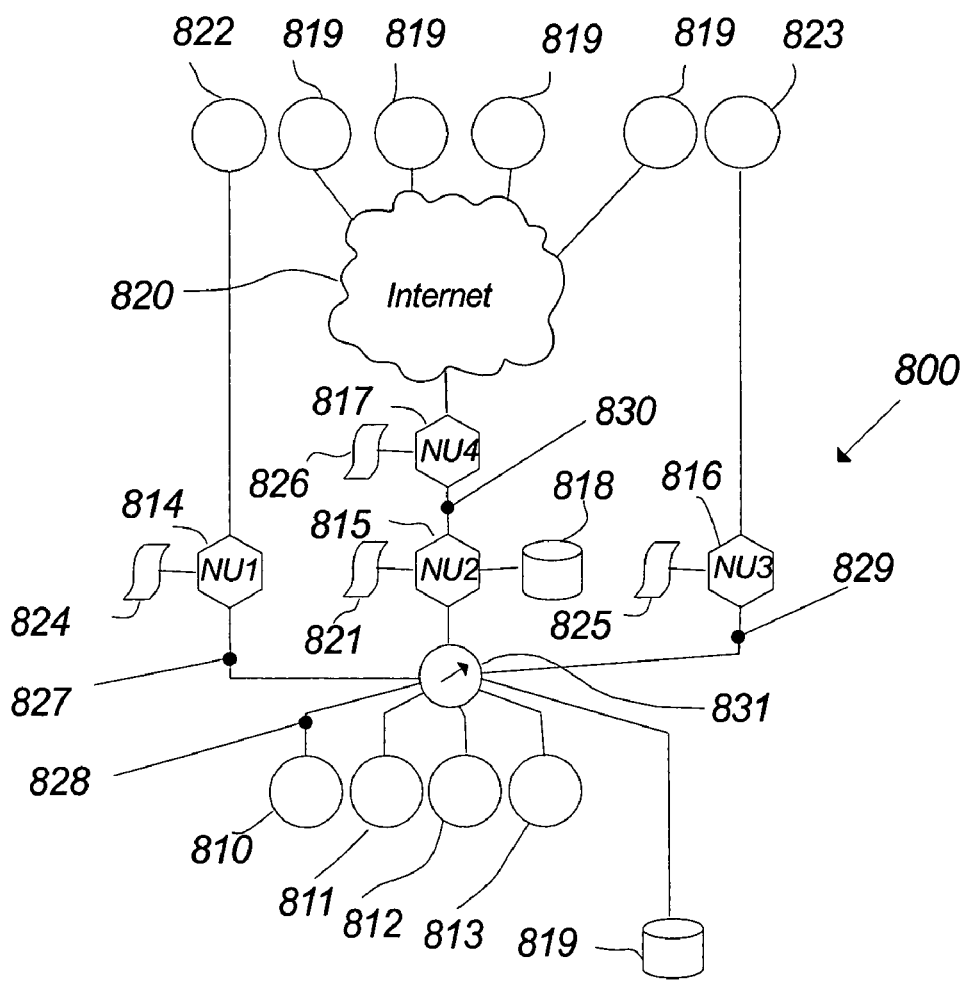
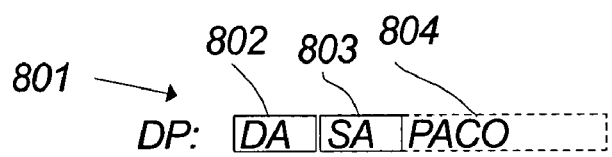
Fig.8a
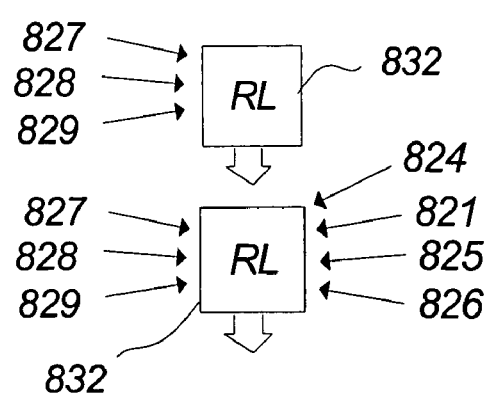
Fig.8b
Fig.8c
Fig.8d

SYSTEM FOR PROVIDING SERVICES AND VIRTUAL PROGRAMMING INTERFACE

FIELD OF THE INVENTION

The invention relates to a system for providing customer requested services, a system for preparing an automatic execution of a test program, a method of monitoring the traffic of data packets in a data network, and a virtual application programming editor.

BACKGROUND OF THE INVENTION

In order to be able to test, control and/or monitor the integrity, security and/or quality of a data system, e.g. a data processing system, a data processing device and/or a data network, a number of tests, e.g. test software application, have been developed and utilized.

The proprietor or provider of a data system will have to purchase a number of different tests, e.g. software applications, in order to—for instance—be able to achieve a certain degree of security including detection and documentation, and accordingly take action on hacker attacks, cyber vandalism, unauthorized accessing of confidential data on the system, destruction or distortion of data, congestion of data processing, crashing of the data system etc. Different test are normally dedicated to different scopes of the security problem and will have different advantages and flaws in relation to a particular data system and in relation to a particular security aspect.

Further, the development of data systems, e.g. both hardware and software, demands a corresponding development to the test software application. Similarly, weaknesses and security flaws in data systems are discovered ongoing, demanding corresponding updating of current tests.

In consequence, a proprietor or a provider of a data system will have to invest in a number of different test programs, each facilitating said different security checks, in order to obtain a certain degree of security in relation to the data system. Further, the proprietor or provider will have to purchase new versions of said tests, updates and/or new tests in order to be able to retain the same degree of security. Finally the proprietor or provider will have to allocate labour resources to the task of implementing the tests, updating tests and/or installing new versions of tests.

Because of the expenses and efforts involved both in purchasing tests/updates and in running said tests, the efforts involved in the security may lead to a result, which is far from optimal. Therefore a need exists to provide security testing, monitoring and other security related services to data systems, whereby the proprietor or provider of such data systems may obtain such tests etc. in order to be able to check the security level of his/her system, in order to be able to correct detected flaws/weaknesses, and in order to be able to retain the security level of the system/systems and preferably also improve the level of security without having to invest an increased amount of money, labour and effort.

SUMMARY OF THE INVENTION

The invention relates to a system for providing customer requested services relating to—for instance—security, monitoring and/or data acquisition in relation to a data processing device and/or a data network (Target 1-Target k) of a customer, wherein one or more of a plurality of tests are selected to be executed in relation to said data processing device and/or a data network (Target 1-Target k), said selection (201; 202; 203; 210) of one or more tests are executed from a test, monitoring, alerting, documentation and reporting services server (TSMADARS-server) which is connectable to said data processing devices and/or data network (Target 1-Target k) via a communication network (140), and wherein data representing results of said selection of tests may be accessed by the customer via a communication network and/or transmitted to said customer.

Hereby the customer or user will have the advantage that it will not be necessary to install/download special testing software on the data processing equipment in question. Thus, problems in relation to the execution of such testing software as well as problems concerning the acquisition of the test results and the analysis of such results may be avoided. Further, as it often will be advantageously to utilize two or more different types or makes of testing software applications/systems, the need to invest in a multitude of testing software applications will be avoided by the invention. Similarly, expenses and labour involved in updating such testing software and/or purchasing new software as the already purchased versions become outdated or obsolete will be avoided.

Thus, the system according to the invention will provide the customer/customers with a cost efficient system for performing an efficient and contemporary checking of security, quality, vulnerability, information relating to the security etc., e.g. newly discovered weaknesses etc. and similar or related aspects in relation to the data processing equipment of the customer.

Preferably, said one or more selected tests may be selected on the basis of preferences of the customer and/or on the basis of an analysis of said data processing device and/or data network of the customer.

Hereby it is achieved that the selected tests, which constitutes a test suite, corresponds to identified, expected and/or suspected fields of problems, said fields identified by means of the experience of the customer and/or the experience and in-depth knowledge relating to—for instance—security and testing items of the provider of the system according to the invention.

In a further embodiment, said one or more selected tests may be selected on the basis of results of one or more manually, e.g. operator initiated executions of tests on said data processing device and/or data network.

Hereby it is achieved that the selection of tests, i.e. the test suite, will be selected on the basis of results reached by performing a set of tests, whereby the results may be observed and analyzed, giving valuable information about which test/tests to choose in relation to a particular data processing system, equipment and/or network. Further, the observed results of the manually initiated tests may serve as reference values, which may be utilized in connection with a processing and/or analysis of results of consecutively performed tests by the system according to the invention.

Advantageously, said one or more tests may be configured to be executed each on predefined points of time and/or in predefined intervals of time.

Hereby it is achieved that the execution of the selected tests constituting the test suite may be configured to fulfill a wide variety of requirements and/or to operate under consideration of a wide variety of constraints. For example, certain tests may advantageously be scheduled to be performed on points of time when the data processing equipment is heavily loaded, e.g. to perform connection tests, denial-of-service tests, stress load tests etc., while other tests may advantageously be scheduled to be executed on points of time when demand on the data processing equipment is low, e.g. tests, which may cause the data processing, communication etc. to be interrupted and may cause failure to the data processing equipment and/or software, which tests preferably may be located on points of time when a breakdown or a slowdown of services may be tolerable and/or when skilled personnel will be readily available to correct the failure.

In a further embodiment said one or more tests may be configured to be executed each on a regular basis and the frequency of said regular executions may be specified preferably in accordance with customer preferences and/or on the basis of analysis/analyses and/or a reference testing on said data processing device and/or data network.

Hereby it is achieved that the execution of the selected tests constituting the test suite may each be configured to be repeated with an interval of time corresponding to an estimation and/or evaluation of the developments, which may take place in relation to the subject of the test/tests in question. For example, if it is estimated that a denial-of-service is a very critical and/or probable failure for a data processing system, network equipment etc., then a relatively high frequency for performing such a test may be configured, while a test for a relatively uncritical and/or relatively seldom occurring failure or condition may be configured to be executed with a relatively low frequency, e.g. once a week, once a fortnight etc.

Advantageously, means may be provided for performing a comparison between data representing one or more results of a test and one or more threshold values and means may be provided for the establishing of an alarm, advice and/or information message.

Hereby it is achieved that in cases where an abnormal condition is observed and where such an abnormal condition constitutes a certain breach of security and/or reliability, the customer and/or a person/persons specified by the customer may be alerted quickly if not instantaneously, e.g. by e-mail, SMS, FTP, telephone, pager etc.

Said one or more threshold values may be specified by the customer, whereby the establishing and/or emitting of possible alarms may be designed to fit the needs and/or preferences of the customer, e.g. the customer may specify a threshold which lies close to actual values for parameters which are very important and/or vital to the customer and/or the system/users of the system in question.

Preferably, said one or more threshold values may be specified on the basis of results of manually initiated executions of one or more tests performed on said data processing device and/or network.

Hereby it is achieved that the threshold values and thus the alarm/advice initiating conditions will be specified on realistic terms and whereby it is achieved that the emitting of alarms/advices will be of considerable advantage to the user/users.

Said manually initiated executions of one or more tests, e.g. reference tests, performed on said data processing device and/or network may be performed with regular intervals of time.

Hereby it is achieved that the reference values will be adapted to the conditions changing with time, e.g. as the target data system evolves and as the load on said target system changes. Obviously, some or all of the threshold values need to be amended in consideration of these changes. If not, the alarms/advices may loose their importance, either because alarms/advices will be established with a larger frequency, whereby a tendency to ignore these will result, or because alarms/advices very rarely will be established because the threshold values now are so far away from the actual values that alarm conditions in reality never or very seldom will occur. By this embodiment of the invention these drawbacks will be avoided as the threshold values regularly will be checked and amended, if necessary.

Advantageously, said communication network, by means of which said test suite, monitoring, alerting, documentation and reporting system server (TSMADARS-server) is connectable to said data processing device and/or data network (Target 1-Target k) may be a secure network facilitating use of said authentication and/or encryption.

According to a further embodiment, said communication network (140), by means of which said data representing results may be accessed, be downloaded and/or transmitted by/to the customer may be a secure network facilitating use of authentication and/or encryption.

Advantageously, said plurality of test applications may comprise tests relating to security testing, quality testing, telecommunication security testing, security information collecting service, security auditing, communication line testing and/or test laboratory services.

When said one or more selected tests are configured in a test suite file dedicated to each of a one or more customers, said test suite file comprising for each test information relating to a target data system and relating to the execution of said test, an advantageous manner of configuring the selected tests are achieved, facilitating the execution of the test suites.

When said test suite file may comprise one or more links each to a recorded preparation of a software application, said preparation or preparations comprising input actions and/or operations performed on a graphical user interface, it is achieved that tests etc that comprise a user interface demanding a number of manual operations to be performed e.g. by computer mouse, cursor, keyboard etc, before the test can be executed, may advantageously be prepared for an automatic execution and be executed similar to other test software application in the test suite file.

When said one or more recorded preparations of a software application is/are dedicated to a particular target system a further preferred embodiment is obtained.

According to a further aspect, the invention relates to a system for preparing an automatic execution of a test software application, said test software application comprising input means for operating said test software application and/or for specifying and/or selecting parameters relevant for the execution of said test software application and wherein said input means may be operated by means of computer input means such as a keyboard and/or a computer mouse, wherein said system comprises means for storing
        data indicative of operations performed on said test software application by means of said computer input means, and
        parameter data specified and/or selected by means of said computer input means, and
    means for indicating a sequential relation between said data.

Hereby it is achieved that manually performed operations such as selection of a graphical button and a subsequent activation by a mouse-click or double-click, an activation of a roll-down-menu and subsequent selection of an item, an activation of a data input field and specification in this field of an input by means of a keyboard etc. may be "recorded" and later simulated for an automatic execution of the same operations, whereby an execution of for example a number of mouse/cursor/keyboard operations in the graphical user interface of a software application may be performed in an automatic manner upon an initial start-up command.

Thus it is possible to prepare tests and other security related software applications for an automatic execution involving a test suite file wherein the selected tests are listed in a relatively simple manner, and wherein also software applications requiring a more complex preparation in order to have it running may be inserted. The system according to this aspect of the invention therefore constitutes an important feature in relation to the system for providing customer related services.

Advantageously, said means for indicating a sequential relation between said data may comprise a sequential listing of data stored by said storing means.

Further said data indicative of operations performed on said test software application by means of said computer input means may comprise data indicative of a reference location of a graphical user interface of said test software application and possibly data indicative of a dimensional relationship between said graphical user interface and said computer input means.

The invention relates to a method of monitoring the traffic of data packets in a data network (800) comprising a number of network units (814-817), at least one of said network units (814-817) comprising access control lists (821, 824, 825, 826) defining data traffic rules associated to the network units (814-817), the data traffic of the said network comprising data packets (801), said data packets (801) comprising at least one destination (802) and at least one source address (803), establishing at least one reference list (832) reflecting a number of data traffic rules associated to the said network unit (814-817)

establishing at number of "monitoring points" (827-830) in the said network (800), measuring the data traffic in the said monitoring points (827-830)

comparing the said measured data traffic with the said data traffic rules, establishing a warning if the comparing reveals that measured data traffic comprises data packets conflicting with the said reference list (832).

The at least one reference list (832) reflecting a number of data traffic rules associated to the said network unit (814-817) may be established manually by e.g. typing, or the list may be established as a common log-file automatically reading all the rules of units of the network into one file.

The monitoring points may e.g. be established by a physical connection to a segment of the network to be monitored.

A warning may e.g. be an alarm or simple a text-indication of the status, which may easily be conceived by a skilled by a system operator.

When at least one reference list (832) comprises data traffic rules copied from at least one of the access control lists (821, 824, 825, 826) associated to the said network units (814-817), a further advantageous embodiment of the invention has been obtained.

An advantage of merging the access control lists into a rule list RL is that all established rules or filter functions are compared to the actual data traffic of the network, thereby reducing the risk of overlooking non-intended data traffic.

When the said destination address (802) comprises an IP-address or generally, addresses related to other types of protocols and where the said source address comprises an IP-address or an address related to other types of protocols, a further advantageous embodiment of the invention has been obtained.

Data packet traffic of traditional data networks may thus be monitored and controlled by evaluation of said IP addresses, destination and/or source addresses, of the data packets.

When the said traffic rules comprises different combinations of forbidden source and destination addresses, a further advantageous embodiment of the invention has been obtained.

Preferably, the data traffic rules may also comprise different combinations of forbidden source and destination addresses combined with data content descriptions of the forbidden data packets.

When at least one of the said network units (814-817) comprising access control lists (821, 824, 825, 826) defining data traffic rules associated to the network units (814-817)—for instance—comprises a firewall and/or a network router and/or a network bridge, a further advantageous embodiment of the invention has been obtained.

A typical network unit of the above kind is a firewall, enabling different kinds of protection against unwanted data traffic. Thus, a firewall often represents the connection of a web-server to external users.

When the said monitoring points are established in preferably all identified segment of the network (800), a further advantageous embodiment of the invention has been obtained.

When the said reference list (832) is established for the purpose of simulating the data traffic in the network if at least one of the access control lists (821, 824, 825, 826) of the network units (814-817) are changed, a further advantageous embodiment of the invention has been obtained.

The invention relates to a method of monitoring the traffic of data packets in a data network (800) comprising a number of network units (814-817), at least one of said network units (814-817) comprising access control lists (821, 824, 825, 826) defining data traffic rules associated to the network units (814-817), the data traffic of the said network comprising data packets (801), said data packets (801) comprising at least one destination (802) and at least one source address (803), establishing at least logging file in a database (819) reflecting log-messages established in at least one network unit (814-817)

comparing the said log messages to pre-established log-patterns, establishing a warning if pre-established patterns or variations of the pre-established patterns are identified.

When the said log-messages are established by different networks units (814-817) of the network, a further advantageous embodiment of the invention has been obtained.

Moreover, the invention relates to a Virtual API editor (606) according to claim 28 comprising means for selecting an application, said application being operated by means of a graphical user interface (605) on data processing means (602) and at least one associated input device (603, 604)

means for displaying (601) the graphical user interface (605) of a selected application in a display area (601)

means for establishing at least one virtual input device script (303), said virtual input device script (303) defining the sequential operation of at least one input device (603, 604)

According to the invention a user may establish a virtual input device script reflecting a human realtime operation of a selected application. Such established virtual input device script may then be applied for a batch-running of the selected application, i.e. a chosen software application. The software application may then, so to speak, be operated on a batch basis by virtual input devices.

According to the invention, a batch running of a software application may be established on almost every thinkable software application which may be operated on a computer by means of e.g. a mouse and a keyboard.

Hence, software applications may run according to somewhat primitive virtual input device script in a batch mode even if the software applications contains suitable API. (API: Application Programming Interface).

Further advantageous options within the scope of the invention is that the virtual input device script may function as a user input device log, describing the operation of the computer on a macro-level.

Hence, the log-file may be used for tracking faults in the recorded manual operation of the selected software application, or it may even track if users perform undesired operations of certain software applications even if the software applications contains no log-facilities whatsoever.

When means for executing the said virtual input device script (303) in such a way the said virtual input device script (303) results in an execution of the said selected application via the said graphical user interface (605) associated to the said selected application, a further advantageous embodiment of the invention has been obtained.

Moreover, the invention relates to a method of establishing a virtual API editor (702) comprising.

reverse engineering the program code of a selected software application, identifying a number of relevant input fields in the code of the software application, providing a graphical user interface (701) having input fields corresponding to the relevant input fields, inserting data by means of at least one computer input device (603, 604) into the reverse engineered program code in the identified relevant fields via the said graphical user interface (701), compiling the established program code comprising the inserted data into one instances of an executable application of the selected application.

THE FIGURES

The invention will be described in further detail with reference to the drawings, of which FIG. 1 shows a general overview of a system for providing customer requested services in accordance with a preferred embodiment of the invention, FIG. 2 illustrates a number of customer test suite configuration files and their content, FIG. 3-FIG. 7 illustrates different aspects of a Virtual API according to one preferred embodiment of the invention.

FIG. 8 illustrates the operation of a User Behavior Agent on a data network according to one embodiment of the invention.

DETAILED DESCRIPTION

In FIG. 1 a system for providing user requested services is illustrated in a schematically manner. The system, which is in the form of an application service provider (ASP) system, comprises a test suite, monitoring, alerting, documentation and reporting system (TSMADARS) generally designated 101. This system, e.g. ASP-system, which operates continuously, i.e. 24 hours a day seven days a week, comprises a server or a number of servers generally named TSMADARS-server means and generally designated 102. Further, the TSMADARS-server means comprises a number of different test software applications, monitoring software applications, supervisory software applications etc. which software applications in the following may be referred to as simply test software applications or tests, although the software applications concerned may have a scope differing from test software applications or have a wider scope than test software applications as such taken in a literal sense.

The system for providing user requested services according to an embodiment of the invention will be in the form of a supervisory control and data acquisition system (SCADA).

The involved tests are generally designated 103 and are for reasons of simplicity, which shall be explained later, grouped in a number of groups 103a-103h in FIG. 1.

The TSMADARS-server means is able to facilitate a number of different services, e.g. categories of tests in order to fulfill requirements of a user or customer requesting a particular service or services 110-119, e.g. categories of tests. Such tests may as illustrated be security tests (SEC) 110, quality tests (QA) 111, telecommunication-security tests (TELE) 112, tests for security risk information (intelligent information collecting service) (SECINFO) 113, security audits (AUDIT) 118, communication line tests (COMM) 119, although other categories of test may be utilized, e.g. test laboratory (LAB) etc.

Some of the test software applications 103 may be utilized in connection with two or more services, e.g. a particular test may be grouped in both group 103a and 103g, while another may be grouped in groups 103b, 103c and 103h.

The test software applications may operate on the basis of two different principles. Some tests may be performed as purely external test methods, e.g. tests, wherein an influence, an attack, a scanning, a request, a demand, an external logging etc. is directed toward the target network or system, while others may be arranged to operate at least partly inside the target network or system, e.g. where an internal logging is performed, where an allowable data packet, request, command etc. is communicated inside the target network or system in order to check the internal conditions of the target network or system, e.g. whether internal ports are unintentionally open for certain data packets, whether an internal blocking of certain ports are possible, whether certain types of data packets may enter certain parts of the target system unintentionally etc.

The catalogue of tests is designed to comprise both such types of tests and tests operating on both principles simultaneously. The system for providing user requested services according to the invention is thus also designed to facilitate such types of testing in order to provide optimal testing, monitoring, auditing etc. facilities to customers.

An example of a listing of some of the test in the test catalogue and their relation to the services provided is shown in the following table:

| SERVICE | DESCRIPTION | TESTS |
|---------|-------------|-------|
| SEC | Security tests | Inventory scan |
| | | MibBrowsing |
| | | Portscan |
| | | Vulnerability test |
| | | D.o.S. tests |
| | | BruteForce/intrusion |

-continued

| SERVICE | DESCRIPTION | TESTS |
| --- | --- | --- |
| | | UBA—user behaviour agent (LOG files) |
| | | UBA—user behaviour agent (Protocol) |
| QA | Quality tests | Ping |
| | | TraceRouting |
| | | GET requests |
| | | Connection test |
| | | STress load test |
| | | Broken links |
| | | Bottlenecks (network traffic analyzer) |
| TELE | Tele security tests | War dialing |
| | | BruteForce/intrusion |
| | | UBA—user behaviour agent (LOG files) |
| AUDIT | Security audits | Auditprogram |
| COMM | Communication line tests | Accessibility |
| LAB | Test laboratory | Test environment |
| | | Education |
| SECINFO | Intelligent information collecting service | Scanning |
| | | Reports |
| | | Alerts |
| etc. | ... | ... |

Brief descriptions of these tests supplemented with a few examples will be given in the following:

SEC:

Inventory Scan:
  Mapping of active network units, which responds to Ping (ICMP) requests or which can be identified by means of reverse DNS lookup.
  (Example: Machine 212.130.xy.z is HELENA MS NT4 server, SP3).

MibBrowsing (Management Information Base Browsing)
  Requests on the configurations of network units via active SNMP (Simple Network Management Protocol) agents.
  (Example: SysUpTime=0 days, 3 min, 45 sec)

Portscan
  Search of active TCP (Transmission Control Protocol) and UDP (user datagram protocol) ports of network units.
  (Example: TCP port 80 is http, i.e. browser access to the Internet)

Vulnarability Test
  Systematic search of possible weaknesses in the operative systems of network units by means of complex algorithms and informational databases.
  (Example: Machine 212.130.xy.z has 1 high risk, 3 medium risks and 1 low risk vulnerabilities)

D.o.S. (Denial of Service Tests
  Systematic search of possible "not in service" weaknesses in the operative systems of network units by means of complex algorithms and informational databases.
  (Example: Machine 212.130.xy.z has 0 high risk, 1 medium risk and 1 low risk vulnerabilities)

BruteForce/Intrusion
  Systematic (initially with dictionary/dictionaries, then by means of combinations) attempts of logins through active ports of network units.
  (Example: Port 23, WWWNET, is open on machine 212.130.xy.z: Try user OL and all combinations of passwords from aaa to zzz).

UBA—User Behaviour Agent (LOG Files)
  Systematic, correlational search for abnormal behaviour in log files of network units.
  (Examples will be given later in the following)

UBA—User Behaviour Agent (Protocol)
  Real-time search of traffic on network for abnormal user pattern/patterns.
  (Examples will be given later in the following)

QA:

Ping
  Collecting of response times for network units by means of Ping (ICMP)
  (Example: Response from 212.130.xy.z: Bytes=32, average time>10 ms)

TraceRouting
  Collecting of response times for network units by means of Ping (ICMP) and analysis of route for data packets through networks.
  (Example: Traces route to machine 212.130.xy.z through xx-router, yy-firewall, zz-gateway etc)

GET Requests
  Collecting of response times for services of network units by active ports.
  (Example: GET http://www.abcdefg.dk/index.html=644 ms).

Connection Test
  Collecting and analysis of services of network units by active ports.
  (Example: WWWNET 212.130.xy.z gives "Welcome to AAA server v6.5.4 ESTMP).

Stress Load Test
  Exerting load on services of network units with an increasing number of virtual users simultaneously until the system is overloaded and crashes.
  (Example: Web system MS IIS 5.0 crashed at 5444 virtual users at the same time; X hereof performed this and YY hereof performed that etc.).

Broken Links
  Search of web system of network unit for references not active.
  (Example: http://www.abcdefg.dk/index.html has 1 broken reference, i.e. http://www.abcdefg.dk/pricelist.html).

Bottlenecks (Network Traffic Analyzer)
  Measurements of performance through network for "bottlenecks" and causal analysis hereof.
  (Example: Congestion at router 212.130.xy.z: TCP peak=5000 bit/s at 4:15 PM).

Tele:

War Dialing
  Systematic search of active numbers in operative systems of PBX, for which numbers a carrier detection (answering tone) is present.
  Example: 12345678 Carrier at 300 Baud).

D.o.S. (Denial of Service) Test
  Systematic search of possible "not in service" weaknesses in the operative systems of PBX by means of complex algorithms and informational databases.
  (Example: similar to example for D.o.S test for SEC).

BruteForce/Intrusion
  Systematic, combinational login attempts through active numbers of PBX (Telephone switching central):
  (Example: similar to example for BruteForce/intrusion for SEC).

UBA-User Behaviour Agent (LOG Files)
  Systematic search of log files of PBX for abnormal behaviour.
  (Examples will be given later in the following)

Audit:

Auditpropram
  Scheduling of execution of security and quality audits.

Comm:

Accessibility
  Ongoing measurements and analysis of on-time and bandwidth on communication lines Secinfo:

Scanning
  Surveying of newly discovered vulnerabilities/weaknesses on particular network units and PBX'es.
  (Example: 190101: ABCD MIX Dos vulnerability on versions with IOY 12.2.3. See www.abcdef.com)

Reports
  Collecting of technical security and quality information concerning "best buy" (comparisons) concerning network units and PBX'es with ongoing surveying with regard to relevant updatings.
  (Example: An updated buyers guide).

Alerts
  Surveying of newly discovered hacker tools, malicious code etc
  (Example: An updated database).

Lab:

Test Environment
  Access to test laboratory with possibility of testing software on a large selection of hardware platforms.
  (Example: User XX can log into the Bridicum test environment and may access among others a NT and a Unix environment, in which the users own software may be tested).

Education
  Virtual security school (E-learning) with theory and examination.
  (Example: 3 day Hacker Guarding course as distance education incl. hands-on exercises).

The TSMADARS server means 102 is as shown connected to preferably secure storage means 121 for storing data relating to the customers, e.g. services requested, test suites, test results, persons and/or addresses, to whom or which advices should be directed, rules (e.g. thresholds) relating to alarms/advices etc. Further, central control means (CC) 122 is provided to control e.g. the execution of the test suites, the storing of test suites and test results etc.

Means for analyzing test results and identifying, initiating and/or suggesting amendments to the test suites in order to achieve improvements in the test suites may optionally be provided in the form of a test suite optimizer (TSO) 123, which shall be described later.

The t TSMADARS server means 102 is connected to a communication network 140, preferably a secure network, e.g. a network on which an encrypted and authenticated communication is facilitated, for example by means of SSL (Secure Socket Layer) or VPN (Virtual Private Network), which network may be in the form of an optionally secure global network such as the Internet, in the form of radio linked transmission networks, PSTN, GSM, UTMS etc., in the form wired transmission means and/or in the form of leased lines etc. Of course, the connection 140 to/from the TSMADARS server means 102 may comprise combinations of such communication means and the TSMADARS server means 102 may be connected by means of two or more communication networks in parallel.

Users or customers (User 1-User m) are generally designated 150, and the data processing networks, equipment, systems etc, which may be monitored, tested, audited etc. by the system according to the invention, are generally designated 160.

A potential user 150, e.g. User m, who has a need to perform some sort of testing of a data processing system 160 (e.g. Target k), can submit a request to the provider of the services, for example via the transmission network 140, to the TSMADARS server means 102. In the request, the potential user can specify the kind of service requested, e.g. a security service 110, and other specifications relating to said services, e.g. frequency, thresholds, e.g. values relating to the emitting of alarms and/or time of initiations.

The provider of the TSMADARS service will then be able to suggest a suite of tests selected among the available tests 130, which tests will give the requested service/services. An operator controlled initial test run may then be performed on the data processing system 160 in question, e.g. Target k. The operator may execute the relevant tests on the point in time suggested and/or requested by the customer, and may repeat some or all of these, if relevant, with the suggested and/or requested frequencies. The results will be observed and analyzed, and subsequently possible suggestions for alterations concerning test suite configuration, e.g. selection and/or sequence of tests—and even suggestions to use specific testing tools accordingly—, point of time for running said tests, frequency etc. are prepared. These results are presented to the customer, e.g. the customer may access these, using login name and password, download the results to the user's own system via a secure transmission network, e.g. using FTP and preferably authentication and encryption (e.g. SSL, VPN), or the results may preferably via a secure transmission network, e.g. using authentication and encryption (e.g. SSL, VPN), be transmitted to the customer, e.g. as e-mail etc. and conclusively a test suite configuration may be agreed upon.

The test suite approved by the customer will then be configured in the form of a customer test suite file dedicated to said customer and said data processing system. If the customer requests test suites to be operated on more than one independent data processing system, a customer test suite file dedicated to each of said data processing systems may of course be made.

Such a customer test suite file dedicated to a particular customer and a particular data processing system is illustrated in FIG. 2. Herein, a test suite file 210 relating to Customer n is illustrated as one file among a group of test suite files 201, 202, 203 . . . 210 relating to Customer 1-Customer n.

The test suite files are all laid out in the same manner as illustrated for file 210, which essentially contains a listing of operations 211-219 to be performed by the system according to the invention. The file 210 may further comprise a number of fields or columns 221-225, containing different forms of commands and/or information.

Apart from a heading identifying the customer and/or the data processing system (target) to be monitored, tested, audited etc. the first part of the file 210 contains a list of operations concerning particular test, monitoring, auditing etc. software applications. Each of these contains a command field 221, e.g. "Perform", a field 222 identifying the software application, e.g. "BBscan.exe", a field 223 identifying the time, the software application shall be run for the first time, e.g. "11 Jan. 2001 at 09.00", a field 224 indicating the frequency, with which the software application shall be repeated, e.g. "Every week" and a field 225 identifying the target, e.g. an address or the like identifying the data processing system and/or network, for example an IP-address "abc.def.g.h" or an address related to other types of protocols.

After the listing concerning the software applications of the selected test suite the file 210 contains a number of commands 219 relating to the processing of the results of the executions of the software applications, e.g. collecting the results, storing the results, updating the test result files of the customer in question etc.

The test suite files 201-210 stored on the storing means 121 will be run under control of the TSMADARS, e.g. controlled by the central control means (CC) 122, as the control system will cause a sequential scanning of the suite files, identify software applications which at the given point of time must be performed, cause such software applications to be executed and cause subsequent operations such as storing, analyzing of test results and/or updating of the result database/databases to be performed.

The test results may preferably via secure transmission means as described above be transmitted to the customer and/or accessed/downloaded, e.g. in the form of e-mails, FTP, etc. and/or the test results may be readily available for viewing and/or downloading via a preferably secure communication network 140, e.g. the Internet on a website.

Further, special messages in the form of alarm messages, information messages advice messages, alert messages etc. may be forwarded/transmitted to the customer (or persons/addresses/telephone numbers specified by the customer), when certain reference values and/or limits, e.g. maximum and/or minimum values, which values in the following also shall be referred to as thresholds or threshold values, have been reached and/or exceeded. These threshold values may be user specified and/or may origin from the initial test runs performed when the test suite has been configured. The alarm messages etc. may be forwarded to user specified addresses, e.g. e-mail addresses, mobile telephone numbers etc, and the messages may be transmitted to more than one person/address, possibly in a hierarchical system.

The above described manually initiated test runs may be repeated with regular intervals in agreement with the customer in order to detect and/or evaluate the need to modify the test suite. Accordingly, the test suite may be modified on the basis of such reference tests and/or on the basis of an analysis of the target system. Similarly, such reference test results may lead to modifications of reference values serving to cause forwarding of alarm/information messages.

Secure storing of reference test results as well as reference values, e.g. threshold values, serving to define a basis for forwarding of alarm/information/advice/alert messages may be controlled by the central control means 122. Further, the central control means 122 may serve to control the preferably secure transmission of such messages on the basis of customer related and/or specified rules, which may also be stored, preferably in a secure manner, on the storage means 121. As specified above, the secure transmission may be in the form of an encrypted and authenticated communication, for example by means of SSL (Secure Socket Layer) or VPN (Virtual Private Network) or similar.

A customer or user 150 may in a secure manner as described above access the test results at the service provider (e.g. the application service provider ASP), e.g. at a website hosted by the application service provider, as the customer has been provided with a username and a password. The access may preferably be established using cryptography and authentication (e.g. using digital signature), e.g. using a Secure Socket Layer (SSL) protocol or Virtual Private Network (VPN) via the Internet or the like. Similarly, information transmitted from the service provider, test data etc. as well as result data transmitted from the target to the service provider may be transmitted using techniques to assure the security, e.g. using cryptography.

In addition to being able to access test results via a communication network, e.g. the Internet or similar means, the customers/users may be able to inspect the test suite/suites in accordance with the agreement with the service provider and possibly be able to change certain parameters in the test suite/suites, for example the frequency of tests, threshold values, host addresses, telephone numbers, in case these have been changed, etc.

The test software applications 103 used for providing the requested services may be standard test software applications and/or specially developed software applications, which may be developed for use in relation to a particular data processing system and/or network and/or in order to fulfill certain particular requests submitted by a customer or a potential customer.

A number of available standard test software applications may be configured relatively straightforward in the listing constituting a test suite 210 of a customer, as in relation to these software applications only few pieces of information, for example an IP address or addresses, other types of addresses, telephone number/numbers, initial starting points of time and possibly a frequency or frequencies of repetition need to be specified in order to have the software application running. As this information can be specified in the command fields contained in the listing, such software applications will immediately be executed when a starting point of time is reached. However before starting a testing or a monitoring software application, it is checked, for example by the central control means (CC) 122 that the application in question is not running, i.e. that is has finished its previous execution. The central control means 122 will prohibit the execution of the application in such cases until the application has finished or until the application is scheduled to be initiated again according to the test suite file 210.

Other software applications may require a more complex and/or detailed input information, especially in cases where such software applications comprise a graphical user interface with graphical control means such as start buttons, input means for specifying certain values such as for example IP addresses, for selecting certain parameters etc. by use of keyboard, cursor and mouse. In order to be able to execute such software applications automatically, the operations performed on the user interfaces of such software applications in order to achieve an execution of such a software application, the operations, e.g. manually and sequentially performed operations, have to be transformed to a script or the like, which directly may be executed by a computer controlled system. Such a script may then be inserted in or preferably referred to in the customer test suite files 201-210 (FIG. 2). For example, instead of indicating a tag in the field 222 identifying the test software application, a reference to such a script may be inserted instead.

An advantageous feature of the invention and a important part of the system according to the invention, by means of which it is possible to create such customer dedicated scripts, will be described in further detail in the following.

FIG. 3 illustrates the basic principle of one preferred embodiment of the invention.

When dealing with e.g. security monitoring or quality monitoring of data networks, both with respect to internal monitoring and external monitoring, a basic problem is that no monitoring applications are actually complete enough to perform the test alone, due to the fact that intrusion and cyber vandalism may be performed in numerous ways. New methods see the light of the day every day. Consequently, such monitoring should be performed quite often and the monitoring should be updated to match the behavior of unwanted intruders.

Therefore several types of evaluation software applications should preferably by applied when investigating the security of a network. Moreover, the number of applied software applications may often vary with the different tasks and different versions of the applied applications over time.

Consequently, a monitoring of the data security may imply use of many different software applications in many different setups and the combination of the software applications may vary as well.

A problem of many of the applicable monitoring software applications is that they lack an API (API: Application Programming Interface). Therefore, the security monitoring tasks has to be performed manually in time-consuming operations requiring manually insertion of for example IP-addresses etc.

According to one aspect of the invention, the monitoring of the data security should be performed regular and at a well-defined time of the day in order to satisfy the needs of a user requiring a data security test.

In order to meet such need the invention involves the establishing of a Virtual API, VAPI, allowing batch-mode running of security monitoring software applications in certain intervals.

With reference to FIG. 3 the establishing of a virtual API may imply an initial step of pseudo-running an API-less security monitoring software application. The software application is operated by input devices 301, such as a computer keyboard and a computer mouse.

The operation of the input devices when running a certain application is "recorded" thereby facilitating a subsequent running of the software application by means of the recorded behavior of the input devices. The "recording" of the operation of input devices associated to a certain software application may be performed by means of a virtual API editor (VAPI) 302, and the recorded operation is mapped into a virtual input device script (VIDS.) 303

The virtual input device script may be established in many different ways within the scope of the invention, e.g. by a specific recording of the operation or by means of manually software application programming of the VIDS 303. Preferably, the virtual API editor should facilitate a combination of a recording and manually inserted input devices operations.

Subsequently, the virtual input device script, VIDS 303 may run the associated software application (APP) 304 at a given time or if certain predefined criteria are fulfilled, and the software application may generate an output (APPO) 305 accordingly.

Typically, a virtual input device script, VIDS 303, capable of running one software application may be combined with virtual input device script, VIDS 303 running other software applications. Moreover, they may be combined with API code established for running software applications already having an API. Hence, software applications or bundles of software applications may be run in batch mode without the need manually typing and maintenance.

Turning now to FIG. 4, the above operation is illustrated by a VAPI 302 capable of running a selected application (SA) 401, e.g. a war dialing software application, via the software application user interface 402 by means of a VIDS script 303.

As illustrated in FIG. 5, a VAPI 302 may run a bundle of software applications (SA1-SAn) 501-507 by means of different individual scripts as a traditional API scripts running of one or several software applications.

The result of the batch mode running of the software application may be exported to one common database 511 containing the overall desired test results.

Evidently, selected application enabling traditional API may be run both by means of the associated API or an established virtual input device script (VIDS) 303 as well.

A possible establishing of a virtual input device script (VIDS) 303 according to one embodiment of the invention will now be described in detail with reference to FIG. 6.

FIG. 6 illustrates a standard personal computer, e.g. a PC, 602 comprising a monitor 601. The computer is operated traditionally by means of input devices: a keyboard 603 and a mouse 604 via a user interface 605.

According to the illustrated embodiment the desired virtual input device script, (VIDS) 303, is established by means of a Virtual API editor (VAPIE) 606.

The illustrated VAPIE 606, which obviously may be established in several other ways within the scope of the invention, monitors the graphical user interface of a selected application 401.

The illustrated VAPIE 606, here in tile mode, comprises a control bar 607, adapted for recording the operation of the input devices 603 and 604. The control bar facilitates both recording and playing of the recorded/manually inputted VIDS 303. Moreover, the control bar 607 comprises an APPSEL button (not shown) enabling the selection of a software application, e.g. the illustrated software application 401.

The graphical user interface of the illustrated VAPIE 606 is operated by means of traditional input devices, such as a mouse 604 and/or keyboard 603, input pens, etc. A cursor 608 reflects the operations of the input devices.

Moreover, the control bar 607 comprises a number of programming buttons 609 facilitating manually insertion of different commands, such as click, double-click, text insertion, etc. The illustrated control bar 607, which may be applied in several different ways within the scope of the invention will be described in detail below with reference to FIG. 6*b*. One of several possible programming buttons may e.g. by a XY-button (not shown) adapted for the purpose of establishing the reference position of the graphical user interface 605 of a selected application with respect to the established virtual input device script. Such establishment may be performed manually or automatically within the scope.

A simple mapping may e.g. be a mouse XY inputting of at least two border points defining the position and the size of the graphical user interface 605 screen of the selected application, eventually supplemented by computer monitor data or monitor setting, e.g. screen resolution. When, these data has been established, a recording or establishment of the moving of a cursor on the monitor may be related to the actually intended operation of the selected application 401, if the size or position of the graphical user interface 605 screen of the selected application has changed the next time the selected application 401 is opened for execution.

Finally, the editor comprises a virtual input device listing area, (VIDSL) 610, containing the recorded and manually inputted virtual input device script, VIDS 303. The script may be edited on a traditional text-editor basis, and the virtual input device listing area, (VIDSL) 610, may comprise an associated syntax checking algorithm.

The content of a virtual input device listing area, VIDSL 610 may typically comprise a listing or a representation the established virtual input device script VIDS 303 supplemented by suitable explanations, labeling facilities and syntax checks.

The illustrated control facilitates an advantageous establishment of the desired virtual input device script VIDS 303. A segment illustrative bar 611 is provided for illustrating what segments of the VIDS 303 are presently listed in the virtual input device listing area, VIDSL 610, and a pointer 612 illustrates the present position of a timeline (not shown). Hence, VIDS 303 segments present in the virtual input device listing area, VIDSL 610, should be highlighted in the illustrative bar 611.

The basic understanding of a time segment according to one embodiment of the invention is that each segment represent a sequence terminated by a input device action, such as a mouse, right/left clicking, double-clicking or for instance a keyboard "return" command.

An example of a virtual input device script VIDS 303 monitored in the virtual input device listing area, VIDSL 610 may e.g. be a code:

(# is followed by non-executable descriptive text)

```
# XY defining of the position and size of the selected application SA
# by mouse insertion of two opposite corner reference points
# The POS-tag extablishes that the next two left-clicks defines
# the area of the selected application.
<POS>
X0Y0=12, 12
<L-CLICK>
        # End of segment 1
X2Y2=650, 650
<L-CLICK>
        # End of segment 2
#Now, the input script may begin

# Select a pull-down menu by moving the position of a XY defining
X,Y=12, 600
<L-CLICK>
        # End of segment 3
# The select pull down menu segment is terminated
# Move cursor to input field
xy=150, 500
<D-CLICK>
        # End of segment 4
# Enter file name
Heacy.txt
<ENTER>
        # End of segment 5
```

-continued

```
# Move cursor to input field
xy=170, 500
<D-CLICK>
        # End of segment 6
# Enter IP address
<IP>
212.127.8.114
<ENTER>
        # End of segment 7
```

According to the above illustrated VIDS 303, the present play-status is that the <enter> command has just been executed, and that the next action is to move the cursor to positions 170, 500.

The control bar comprises a record button 613. This button facilitates a recording over the segment of the input device operation. A further record button 614 facilitate a one segment at a time recording. Rewind 615 and forward buttons 616 are applied for VIDS 303 scrolling on a continuously basis or segment basis.

Moreover, the control bar comprises means for defining certain standard operations, such as the above listed <POS> or <IP>. These standard "tags" are associated to a certain predefined meaning, e.g. <IP> defining an IP-address. This defining of input values associated to the established VIDS 303 facilitates an easy exchange of key values such as IP-addresses, once a first VIDS 303 associated to a selected software application has been established. Thereby, a VIDS script associated to a certain application may be reuse of the VIDS 303, only requiring an exchange of key values when applying the same software application to the test of another customer.

The running of the established VIDS 303 may be emulated by activating the play/pause button 617 and the operation of the input devices may be emulated graphically simultaneously in order to illustrate the established VIDS 303 operation to the user. Moreover, the VIDS 303 illustrated in the virtual input device listing area, VIDSL 610 should be scrolled simultaneously, thereby illustrating the current position in the virtual input device script VIDS 303.

The user interface 701 is associated to an instance of a software application. The instance of a selected software application may be established by reverse engineering of a certain software application lacking an API.

The reverse engineered code may be mapped together with a roadmap file defining the necessary input fields e.g. according to a DOM (Document Object Model)-tree representation of the reverse engineered software application. The input fields should typically be all the fields needed to be set/filled-in in order to run the application. Therefore, such filed may include trivial default settings common for all the needing executions of the program and it may evidently include the fields needed for the individual executions of the application, e.g. the insertion of for example an IP-address, test parameters, output-file definitions, etc.

When such field positions in the reverse engineered code has been revealed, an execution of the software application to a certain test may be established by specifically inputting relevant IP-addresses, test conditions, test types, etc. in the source code, recompiling the code to an executable instance of the software application.

A user friendly programming tool is described below with reference to FIG. 7.

Figure 7:
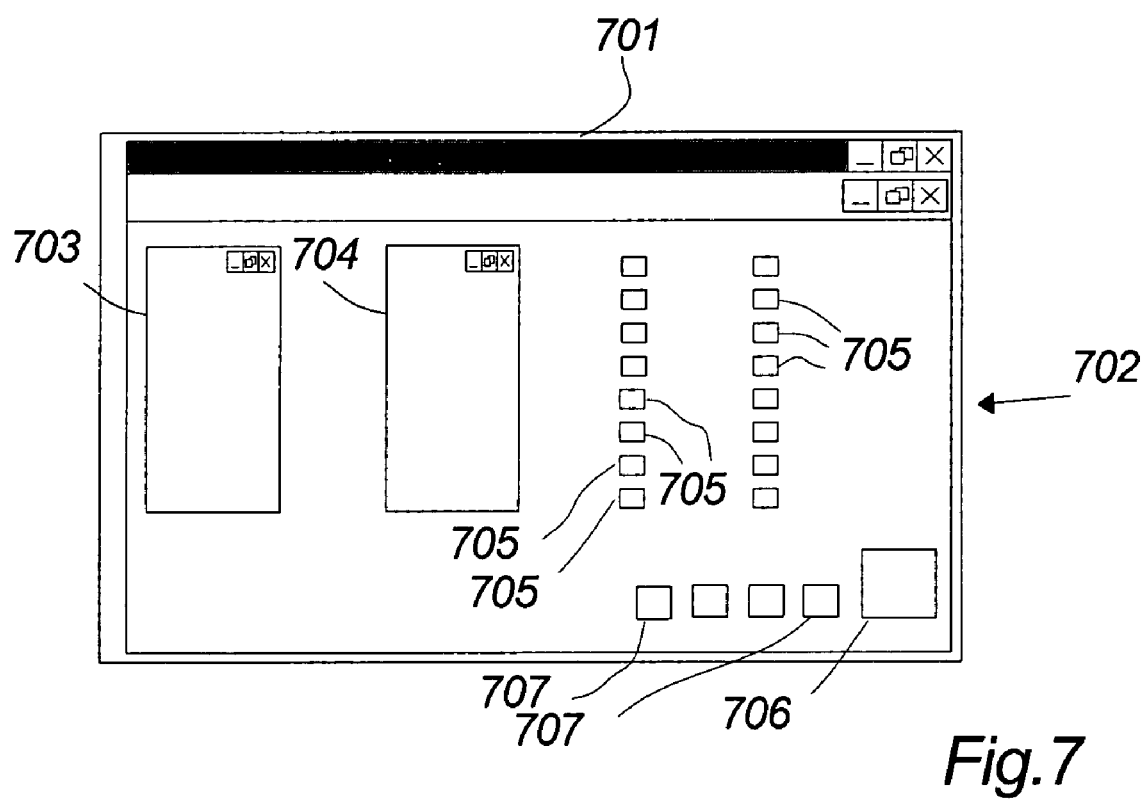
FIG. 7 illustrates the user interface 701 of a further embodiment of the invention.

FIG. 7 illustrates a further embodiment of a virtual API editor (VAPIE) 702 according to the invention.

The VAPIE 702 basically functions as a graphical user interface 701 to the above described reverse engineered code. The graphical user interface 701 facilitates that the user may type in the parameters necessary for the execution of the specific application addressing a specific network.

According to the illustrated graphical user interface 701, an IP-address input field, 703, is provided for inputting for example one or several relevant IP-addresses or addresses relating to other types of protocols. The IP-addresses or other types of addresses may e.g. be comma-separated.

A telephone number input field 704 is applied for inputting of telephone numbers, if the test application e.g. is applicable for telephone test, e.g. war dialing tests, etc.

A number of function check boxes 705 is provided for checking the applicable function according to the desired execution of the program. The choosing of desired functions may vary from task to task and from customer to customer.

When the operator of the VAPIE 702 has finished the insertion and checking of the desired function he may activate a compile activation button 706, thereby invoking the compilation of the selected application 401 with the specific inserted parameters. Hence, the compilation of the application results in an instance of the program, e.g. an exe. file associated to a relevant customer. An execution of the file may then run the program with the parameters inserted and compiled via the VAPIE 702.

One advantage of such a type of virtual API editor (VAPIE) 702 is that several executable instances of a selected application 401 may be established in a simple manner and executed with little effort, when the VAPIE 702 once has been established on the basis of the reverse engineering, thereby reducing the need of manually inputting of customer data, etc each time a test of a certain software application has to be applied. Evidently, such instances of an application may be regarded as a kind of disposable test program dedicated to a certain task and a certain customer. If certain parameters has to be exchanged, e.g. an IP-address, the executable program instance may be disposed and a new instance has to be compiled with the changed data. Evidently, such compilation of a new instances or new instances may be eased if the user only needs to change the relevant data by means of the VAPIE 702 instead of retyping the complete data input.

The illustrated VAPIE graphical user interface 701 comprises other possible buttons 707 or forms (not shown) provided for importing customer records, defining the desired applications, defining an output format, warning outputs, etc.

Evidently, the illustrated VAPIE editor 702 may be constructed in several different ways within the scope of the invention. Preferably, the VAPIE editor 702 should be somewhat customized to the specific application, thereby reducing the complexity of the job of the operator using the VAPIE 702. Such customization may e.g. be a one-to one relationship between the relevant input fields of the application and the graphical user interface 701. An example of such customization may e.g. imply that a VAPIE graphical user interface 701 associated to a selected application only involves IP-address input fields and check-boxes, if no telecommunication tests may actually be performed by the program.

Figure 1:
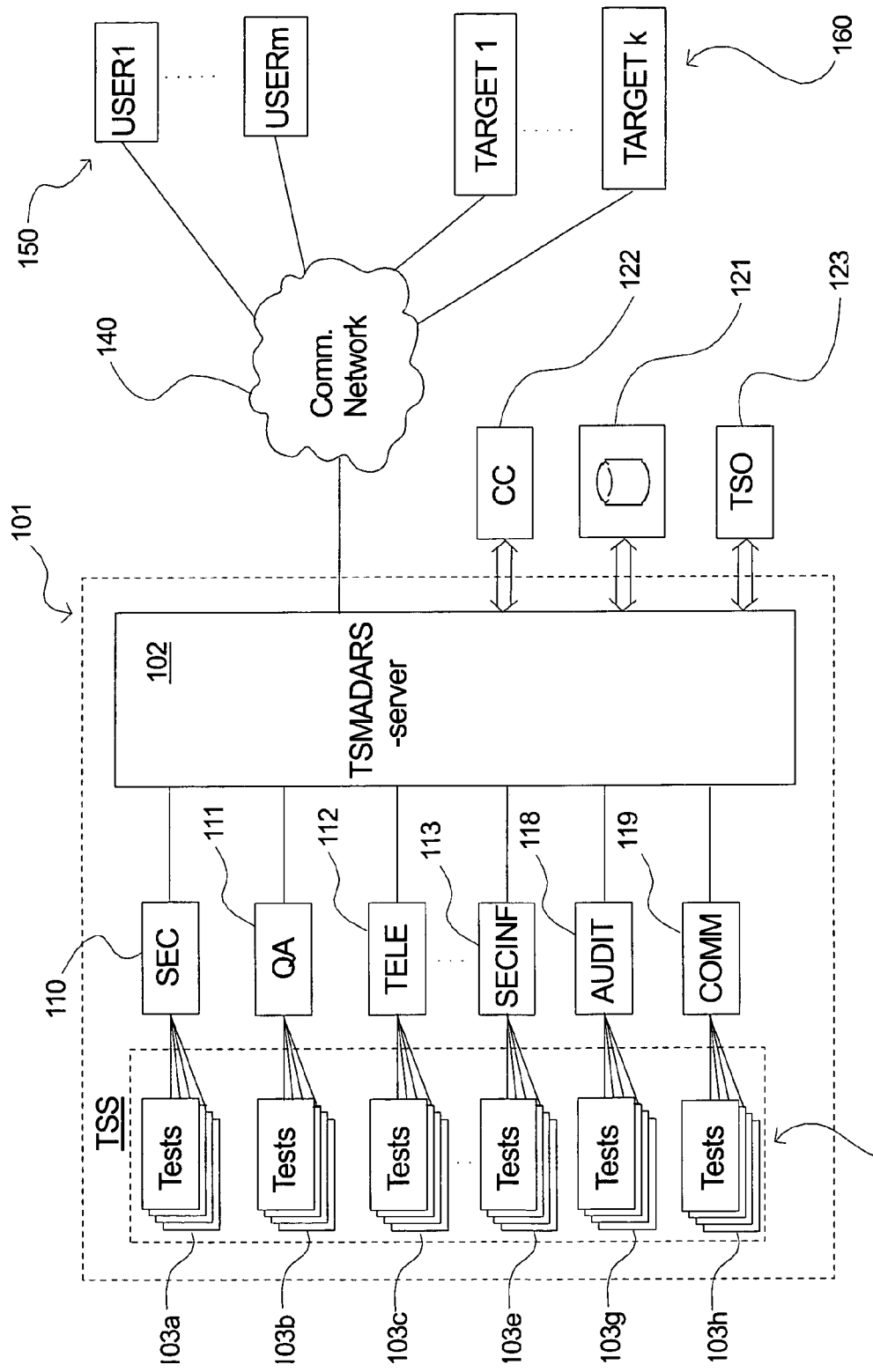
Figure 2:
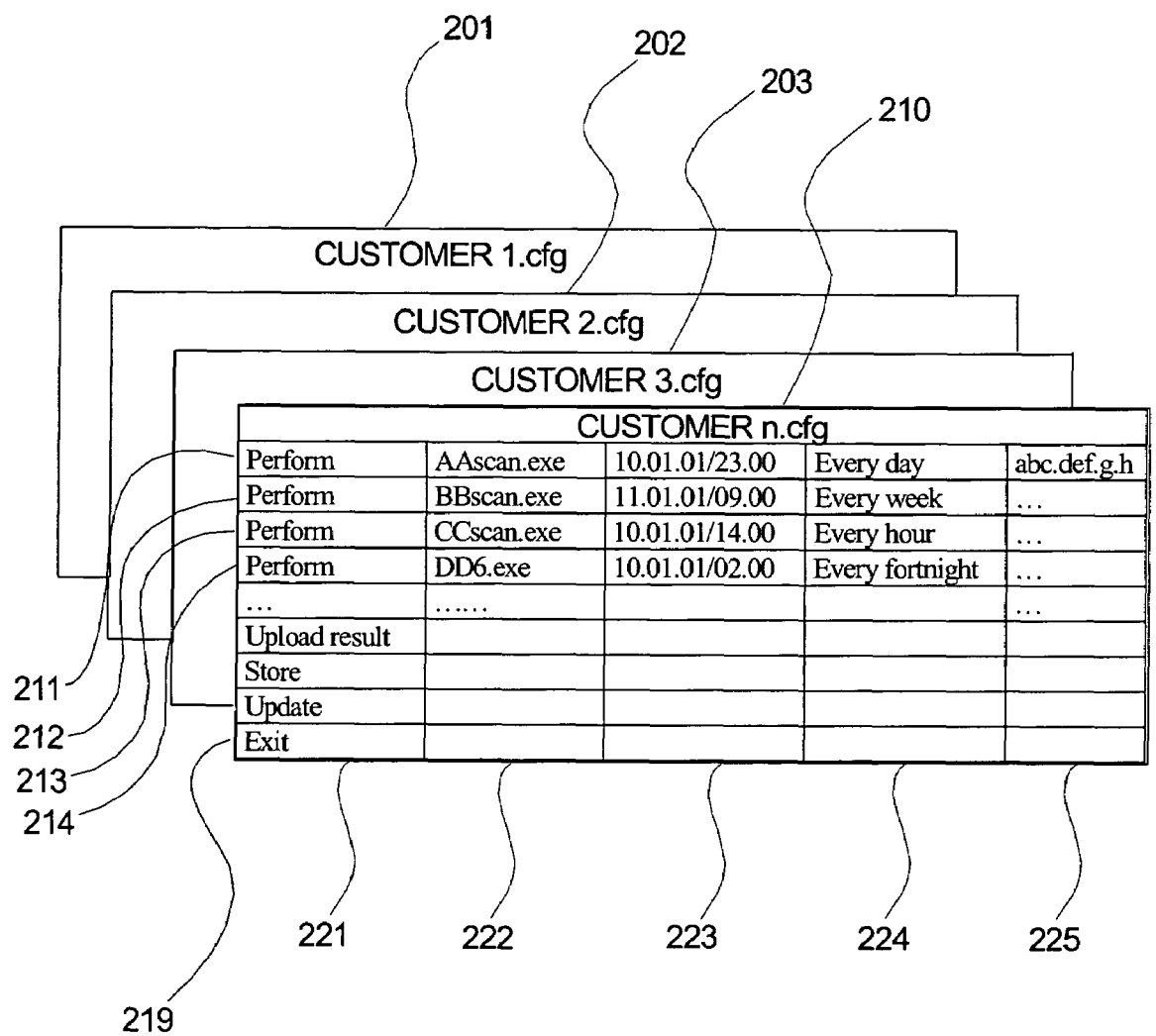
Figure 3:
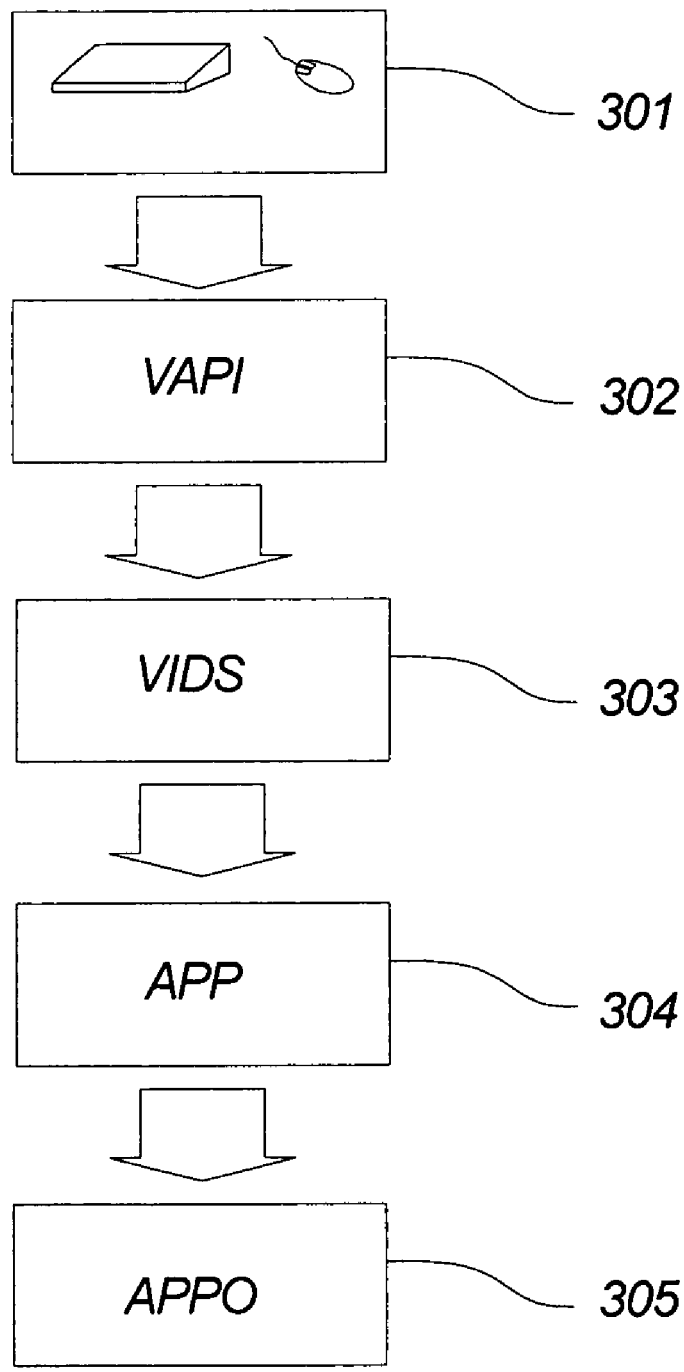
Figure 4:
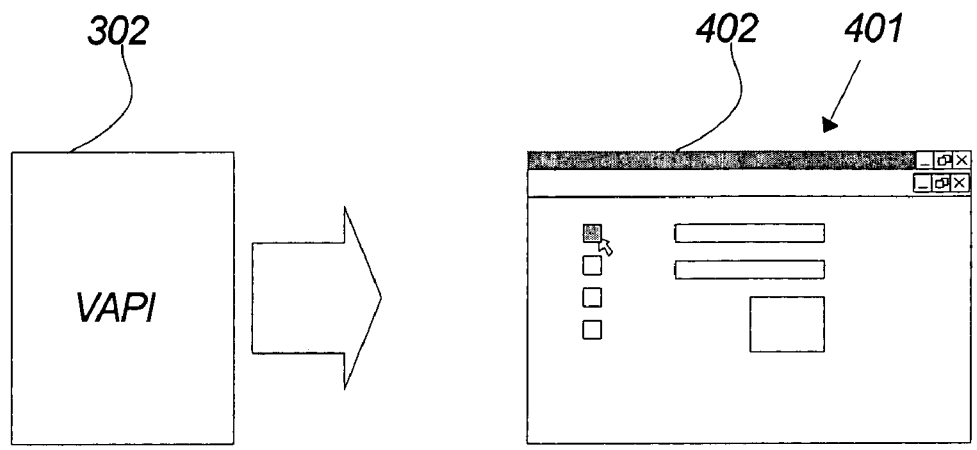
Figure 5:
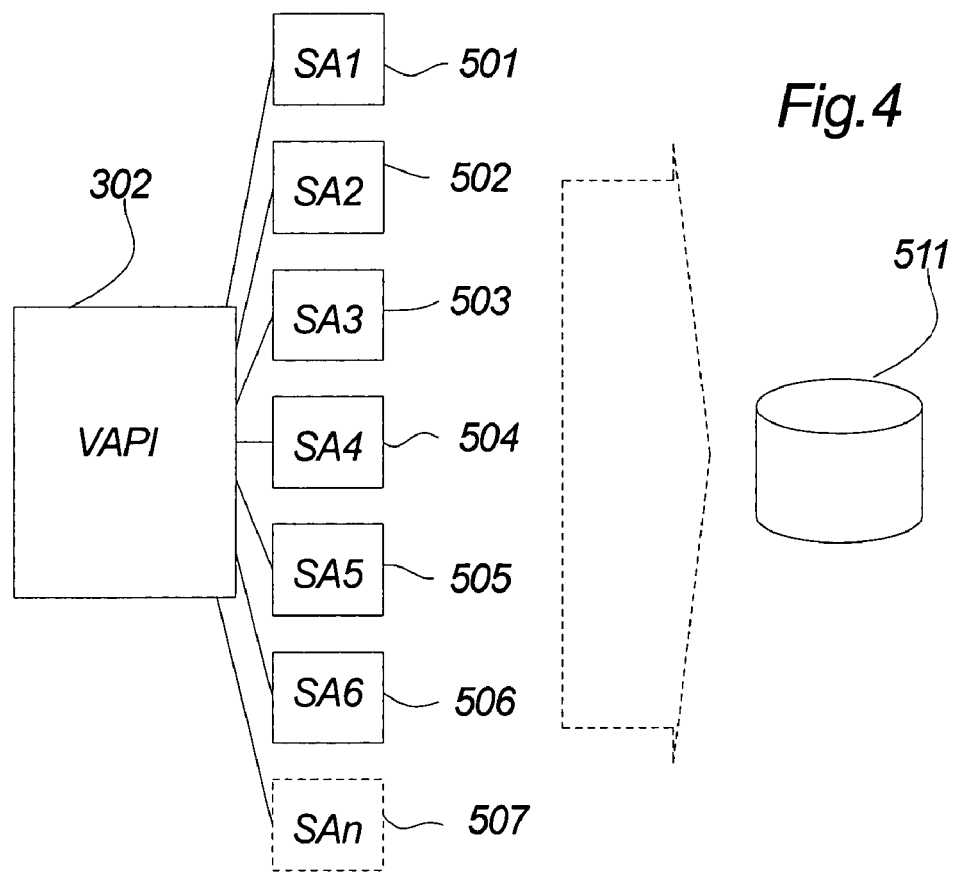
Figures 6A, 6B:
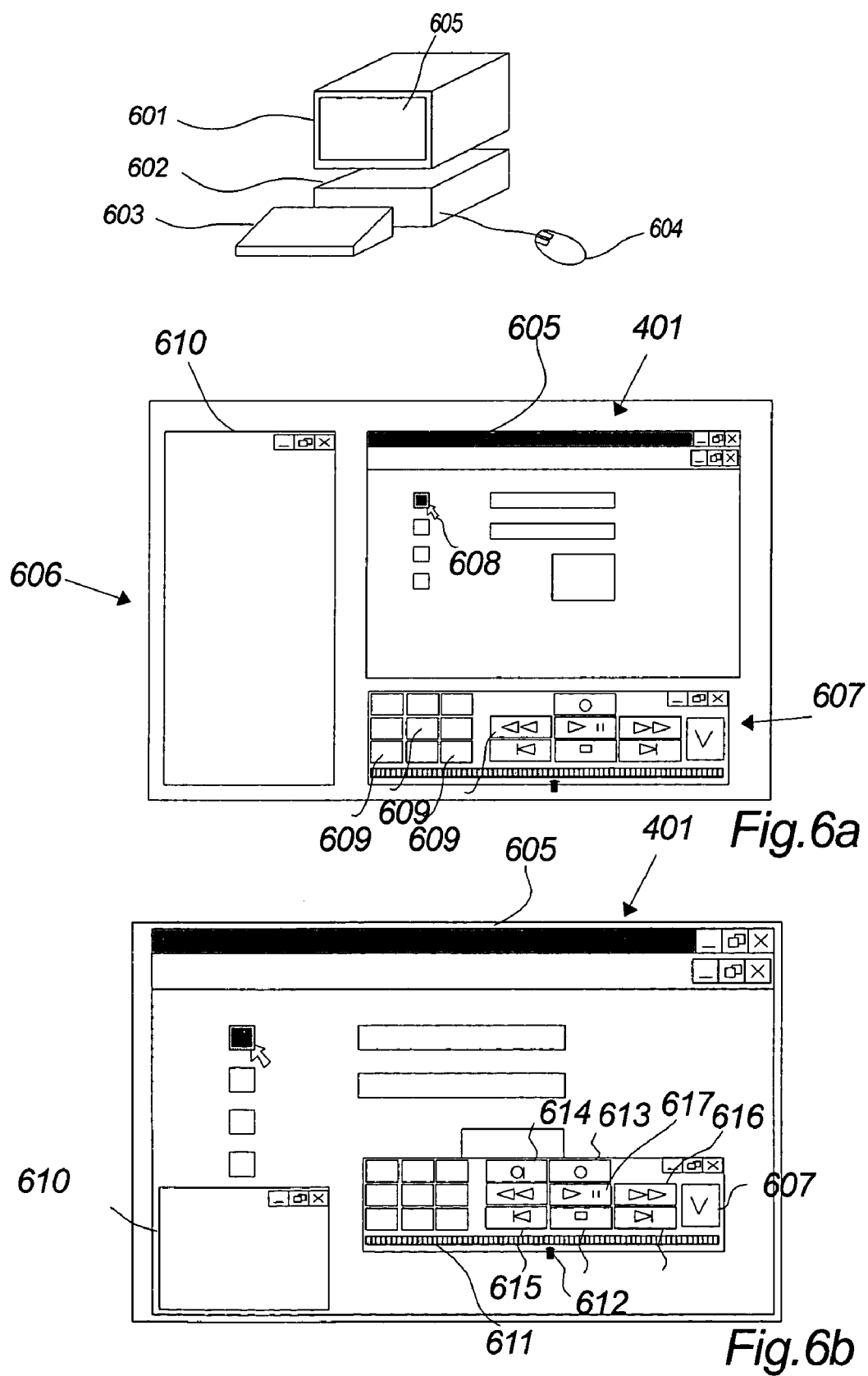
FIG. 6b illustrates a variant mode of the above-described editor in which the VAPI editor 606 operates in a cascade mode, thereby facilitating the operator of the editor to create a VIDS 303 by recording/generating the input device operation over the complete area of the monitor. According to the illustrated embodiment, the control bar 607 acts as a movable task bar.

FIG. 8A illustrates a data network according to one embodiment of the invention and a special feature of the system described in FIG. 1, i.e. a test performed from the "inside" of the system. The special feature is referred to as a user behavior agent, UBA.

User behavior agents UBA's may be applied as external services requiring access to the customer computer, e.g. via encrypted VPN tunnels, or the agents may be installed at the customers network.

The feature will be described with reference to the data network illustrated in FIG. 8A. Evidently, the illustrated data network is only one of several different possible setups and types of networks applicable within the scope of the invention.

The data network facilitates data traffic between the involved units in the form of data packets 801. The data packets comprise a destination address (DA) 802, a source address (SA) 803 and further packet content (PACO) 804 as illustrated in FIG. 8B. The packet content may e.g. be specific data packets, requests-replies, etc. In typical network both source and destination addresses are IP addresses, but could origin from other types of protocols.

The illustrated network comprises a number of internal users 810-813, e.g. accessing the network by means of dedicated PC's. The illustrated network is traditionally linked together by means of network cables and network units 814 (NU1), 815 (NU2), 816 (NU3) and 817 (NU4) and servers (not shown). The network units comprises different e.g. routers, firewalls or bridges.

The basic elements of the illustrated network a database setup comprising two databases 818 and 819. The latter databases 819 are intended for internal storing of log files.

Moreover, the network comprises a database 818 associated to a network unit (NU2) 815 in the form of a so-called firewall. The firewall 815 is established for providing access to external users 819 to a database 818, i.e. web-based database which may be accessed via the Internet 820. Moreover, the firewall should secure that no one of the Internet based user, e.g. external users 819, may access the internal part of the network. Typically, the database 818 should be accessible to both external users 819 and internal users 810-813 as well.

The firewall is configured by means of an access control list (ACL2) 821, defining the allowed traffic to and from the unit (NU2) 815. Such an access control list 821 may e.g. define that all external data traffic are routed to the database 818. The rules of an access control list may also comprise inbound and outbound filters, defining specified undesired or not-allowed types of traffic, e.g.

Undesired traffic may e.g. imply traffic via the router to a specific destination address, for example an IP-address. Other types of undesired traffic may e.g. be defined as a combination of a destination address and certain types of requests.

The front end of the network is comprised by a router (NU4) 817, having an associated access control list (ACL4) 826, located between and connected to the Internet 820 and the firewall (NU2) 815.

Moreover, the network comprises two users 822 and 823, e.g. coupled to directly to the network from a remote location. The users 822 and 823 are coupled to the network via routers (NU1) 814 and (NU3) 816, each router comprising an associated access control list (ACL1) 824 and (ACL3) 825 defining allowed users.

The illustrated users 822 and 823 may principally access with the same rights as the other internal user 810-813 or they may facilitate certain operations defined by the filters or rules established in the access control list 824, 825, respectively.

Finally, the illustrated network comprises a serially operating network switch 831, diving the network into a number of network. Each of the internal users 810-813, the external user 822/router 814 (NU1), the external user 823/router 816 (NU3), the database 819, and the database 818 forms a segment.

Basically, the network comprises a number of network units controlling the allowed network traffic in different parts of the network. Nevertheless, practice has revealed that such network units 814-817 (NU1-4) sometimes allows unintended traffic. This may be due to different factors such as mis-configuration, bad hardware structures, etc.

Therefore, the invention provides external test on a computer network testing whether intrusion or cyber vandalism is actually possible to non-authorized users. Typically, such as test should make the specific weaknesses clear to the owner of the network and the test should result in different proposals eliminating the discovered weaknesses.

Moreover, the invention provides test facilities testing whether something has actually failed, i.e. if non-authorized data traffic has actually passed the firewalls, etc. Therefore, such test facilities necessitates a testing of the inside traffic of the network, and therefore tests will have to performed by means of security routines established in the internal part of the computer network. The tests may be performed by so-called User Behavior Agents (UBA's). The User Behavior Agents may function in several different ways.

According to a first embodiment of applicable UBA's within the scope of the invention, a Watch User Behavior Agent is established for watching illegal data packets within the computer network, and preferably, the Watch agent should give an advice if illegal packets are detected.

The Watch agent implies a number of measure points, e.g. 827, 828, 829 and 830, established within the internal part of the network thought to be secure and free of undesired traffic of data packets 801.

Preferably, a measuring point should be established in each or at least as many as possible segments of the network in order to track unintended traffic on the network. An example of unintended data traffic may e.g. appear, if a department of the company reconfigures the access control list 825 of the router 816 (NU3), e.g. by mistake, thereby opening the network the exterior networks.

Therefore, according to the invention, illegal data packets may be revealed by the watch agent UBA (e.g. located on its own data processing unit having several netcards, one per monitoring point), as data packets coming into the network via the mis-configured router 816 (NU3) are measured and compared to e.g. the rules or some of the rules of the access control list 821 (ACL2) associated to the firewall 815.

An appropriate warning should be raised.

As illustrated in FIG. 8C, the tapped data packets 801 are compared to a rule list 831 (RL) defining a common description of undesired traffic, i.e. data packets. If the comparison reveals that undesired traffic within the network are actually present, the fact should be brought to the attention of a super-user or the like. E.g. by means of a simple log-file which may be opened from time to time by a super-user or some kind of warning e.g. in the form of a text message to a system operator or securely sent electronically to the TSMADARS-server as part of the testsuite setup.

The rule list 831 (RL) may e.g. manually typed e.g. for simulation purposes or the rule list RL may, as illustrated in FIG. 8D by copied directly from the access rule lists 824 (ACL1), 826 (ACL2), 825 (ACL3) or 821 (ACL4) of all or some of the network units 814 (NU1), 815 (NU2), 816 (NU3) and 817 (NU4).

The advantage of merging the access rule lists 824 (ACL1), 826 (ACL2), 825 (ACL3) or 821 (ACL4) into a rule list (RL) 832 is that all established rules or filter functions are compared to the actual data traffic of the network.

The established monitoring and the comparisons may e.g. be used as internal watch-software applications, or it may be applied as an agent stored internally in the network reporting to an external centralized watch company e.g. 823 being in charge of the monitoring of the security of the company network. The agent may also be located externally at the external centralized watch company, e.g. in 823, provided that the external connection is secure and obviously, that the watch company is reliable.

The above described monitoring of the internal traffic in the data network should preferably be supported by tests on the firewalls etc. performed for the purpose of monitoring weak points of the interfaces between the external and internal part of the network. So to speak, a reliable security monitoring should preferably dynamically test the network firewalls ability of keeping undesired data traffic out of the internal part of the network as described according to the above-described system of FIG. 1 and the security monitoring should preferably dynamically monitor the data traffic of the internal part of the network in order to discover if undesired traffic has actually entered the internal part of the network. When unwanted traffic is discovered by simple pattern match performed by the UBA's internal algorithm and database system, alerts are securely sent electronically, e.g. e-mailed, to the local system administrator or to the TSMADARS-server.

Moreover, according to the first embodiment of the invention, the UBA may be applied for simulation purposes. If a modification of e.g. the access control list 826 (ACL2) of the firewall 815 (NU2) is considered, the modification may be simulated by modification of the reference list, thereby emulating the traffic occurring if the considered change is actually performed.

According to a second embodiment of applicable UBA's within the scope of the invention, a Log User Behavior Agent is established. The Log User Behavior Agent is adapted for checking different log files of the computer network, e.g. firewall logs, servers events logs, database log files, etc. The UBA should check these log files and give a warning if user behavior agent detects if activities or users behave different or deviates from normal expected user behavior.

The log-user behavior agent LUBA, should be able of detecting a track in the above-mentioned log-files unusual behavior, and then map the activities of the user until the user log-out. This may e.g. be done by tracking all the destination addresses for the unit associated to the log-file until it leaves the network. The log-file may according to the illustrated embodiment be established in the database 819, e.g. by means of the already established measuring points 827-830 or in many other suitable ways.

The below example illustrates the meaning of collecting log-messages from e.g. a Tabasco router. The name of the router is fictive and the example is only applied for the purpose of explaining important features of the invention.

The log-messages are typically product specific.

FW: Tabasco.
1. DEST. IP address: ICMP overflow time T
2. DEST. IP address: ICMP overflow time T+delta
3 DEST. IP address: ICMP overflow time T+2xdelta The message log-file indicates that a Ping of death has been initiated at the Tabasco router, as the log-messages reveals that the IP address has invoked an overflow in the router at three different times T, T+delta, T+2xdelta.

The behavior reveals that a denial of service dos has occurred or occurs.

According to a third embodiment of applicable UBA's within the scope of the invention, a Protocol User Behavior Agent, PUBA, is established.

The Protocol User Behavior Agent, PUBA involves an agent, which may be located at the customers network collecting network data traffic on a protocol level. The agent may e.g. reside in a dedicated unit comprise several network units. The content of the data packets are analyzed on a realtime basis, an deviating user behavior may e.g. be established by applying more or less complicated neural patterns.

Amongst several possibilities, the Protocol User Behavior Agent, PUBA should establish statistics showing for example which IP-addresses visiting who, when and how often. Certain types of deviating behavior should be reported to the network responsible and to the TSMADARS operators.

According to a fourth embodiment of applicable UBA's within the scope of the invention, a Macro-Log User Behavior Agent, MLUBA, is established.

Basically, the MLUBA's operates in the same way as the LUBA's, with the exception that these agents are adapted for detecting whether user behavior is deviating from the expected on a long-term basis. Thus a Macro-Log User Behavior Agent, MLUBA reports if incidents, e.g. detected for example by the Log User Behavior Agents, are repeated over a long period for example in certain patterns.

The invention claimed is:

1. System for providing customer requested services relating to security, monitoring, and/or data acquisition in relation to a data processing device and/or a data network of a customer, wherein:
   one or more of a plurality of tests are selected to be executed in relation to said data processing device and/or data network;
   said selection of one or more tests are executed from a server which is connectable to said data processing devices and/or data network via a communication network said communication network being a secure network facilitating use of authentication and/or encryption; and
   wherein data representing results of said selection of tests are accessible by the customer via a communication network and/or transmitted to said customer.

2. System according to claim 1, wherein said one or more selected tests are selected on a basis of preferences of the customer and/or on a basis of an analysis of said data processing device and/or data network of the customer.

3. System according to claim 1, wherein said one or more selected tests are selected on a basis of results of one or more manually initiated executions of tests on said data processing device and/or data network.

4. System according to claim 1, wherein said one or more tests is/are configured to be executed each on predefined points of time and/or in predefined intervals of time.

5. System according to claim 1, wherein said one or more tests is/are configured to be executed each on a regular basis and a frequency of said regular executions is specified preferably in accordance with customer preferences and/or on a basis of analysis/analyses and/or a reference testing on said data processing device and/or data network.

6. System according to claim 1, further comprising means for performing a comparison between data representing one or more results of the test and one or more threshold values and means for establishing an alarm, advice and/or information message.

7. System according to claim 6, wherein said one or more threshold values is/are specified by the customer.

8. System according to claim 6, wherein said one or more threshold values is/are specified on a basis of results of manually initiated executions of one or more tests performed on said data processing device and/or network.

9. System according to claim 8, wherein said manually initiated executions of one or more tests performed on said data processing device and/or network is/are performed with regular intervals of time.

10. System according to claim 1, wherein said communication network, by means of which said data representing results can be accessed, downloaded and/or transmitted by/to the customer is a secure network facilitating use of authentication and/or encryption.

11. System according to claim 1, wherein said plurality of test applications comprises tests relating to security testing, quality testing, telecommunication security testing, security information collecting service, security auditing, communication line testing, and/or test laboratory services.

12. System according to claim 1, wherein said one or more selected tests are configured in a test suite file dedicated to each of said customers, said test suite file comprising for each test information relating to a target data system and relating to the execution of said test.

13. System according to claim 12, wherein said test suite file comprises one or more links each to a recorded preparation of a software application, said preparation or preparations comprising input actions and/or operations performed on a graphical user interface.

14. System according to claim 13, wherein said one or more recorded preparations of a software application is/are dedicated to a particular target system.

15. System according to claim 1, further comprising a subsystem for preparing an automatic execution of a test software application, said test software application comprising input means for operating said test software application and/or for specifying and/or selecting parameters relevant for execution of said test software application, wherein said input means are operated by means for computer input, said subsystem comprising:
   means for storing data indicative of operations performed on said test software application by means of said computer input means and parameter data specified and/or selected by means of said computer input means; and
   means for indicating a sequential relation between said data.

16. System according to claim 15, wherein said means for indicating a sequential relation between said data comprises a sequential listing of data stored by said storing means.

17. System according to claim 15, wherein said data indicative of operations performed on said test software application by means of said computer input means comprises data indicative of a reference location of a graphical user interface of said test software application and possibly data indicative of a dimensional relationship between said graphical user interface and said computer input means.

18. Method of monitoring traffic of data packets in a data network comprising a number of network units, at least one of said network units comprising access control lists defining data traffic rules associated to the network units, the data traffic of said network comprising data packets, said data packets comprising at least one destination and at least one source address, the method comprising:
- establishing at least one reference list reflecting a number of data traffic rules associated to the said network unit;
- establishing a number of monitoring points in said network;
- measuring the data traffic in said monitoring points;
- comparing said measured data traffic with said data traffic rules; and
- establishing a warning if the comparing reveals that measured data traffic comprises data packets conflicting with said reference list.

19. Method of monitoring the traffic of data packets in a data network according to claim 18, wherein said at least one reference list comprises data traffic rules copied from at least one of the access control lists associated to said network units.

20. Method of monitoring the traffic of data packets in a data network according to claim 19, wherein said traffic rules comprise different combinations of forbidden source and destination addresses.

21. Method of monitoring the traffic of data packets in a data network according to 18, wherein the said destination comprises an IP-address or an address relating to another type of protocol and wherein the said source address comprises an IP-address or an address relating to another type of protocol.

22. Method of monitoring the traffic of data packets in a data network according claim 18, wherein at least one of said network units comprising access control lists defining data traffic rules associated to the network units comprises a firewall and/or a network router and/or a network bridge.

23. Method of monitoring the traffic of data packets in a data network according to claim 18, wherein said monitoring points are established in preferably all identified segments of the network.

24. Method of monitoring the traffic of data packets in a data network according to claims 18, wherein said reference list is established for a purpose of simulating the data traffic in the network if at least one of the access control lists of the network units are changed.

25. Method of monitoring the traffic of data packets in a data network according to claim 18, further comprising:
- establishing a logging file in a database reflecting log-messages established in said network unit;
- comparing said log messages to pre-established log-patterns; and
- establishing a warning if pre-established patterns or variations of the pre-established patterns are identified.

26. Method of monitoring the traffic of data packets according to claim 25, wherein said log-messages are established by different networks units of the network.

27. Virtual API editor, comprising:
- means for selecting an application, said application being operated by means of a graphical user interface on data processing means and at least one associated input device;
- means for displaying the graphical user interface of a selected application in a display area; and
- means for establishing at least one virtual input device script, said virtual input device script defining the sequential operation of the input device.

28. Virtual API editor according to claim 27, wherein said means for executing said virtual input device script operates in such that the said virtual input device script results in an execution of said selected application via said graphical user interface associated to said selected application.

29. Method of establishing a virtual API editor, comprising:
- reverse engineering a program code of a selected software application;
- identifying a number of relevant input fields in the code of the software application;
- providing a graphical user interface having input fields corresponding to the relevant input fields;
- inserting data by means of at least one computer input device into the reverse engineered program code in the identified relevant fields via the said graphical user interface; and
- compiling the established program code comprising the inserted data into one instance of an executable application of the selected application.

* * * * *